(12) United States Patent
Kim et al.

(10) Patent No.: US 6,215,823 B1
(45) Date of Patent: Apr. 10, 2001

(54) MOTION VECTOR DECODER

(75) Inventors: Jin Kyeong Kim, Kyungki-do; Hwa Young Lyu, Seoul, both of (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 09/221,822

(22) Filed: Dec. 28, 1998

(30) Foreign Application Priority Data

Dec. 31, 1997 (KR) .................................................. 7-80708

(51) Int. Cl.[7] .................................................. H04B 1/66

(52) U.S. Cl. .................................................. 375/240.16

(58) Field of Search .................................. 348/405.1, 409.1, 348/416.1, 415.1, 412.1, 699; 382/232, 234, 236; 375/240.01, 24.12, 24.16; H04B 1/66; H04N 7/137

(56) References Cited

U.S. PATENT DOCUMENTS

| 5,566,089 | * | 10/1996 | Hoogenboom | 364/514 A |
| 5,576,765 | * | 11/1996 | Cheney et al. | 348/407 |
| 5,586,202 | * | 12/1996 | Ohki et al. | 382/236 |
| 5,610,659 | * | 3/1997 | Maturi et al. | 348/42 |
| 5,761,200 | * | 6/1998 | Hsieh | 370/364 |

FOREIGN PATENT DOCUMENTS

237660 * 9/1996 (JP) .................................................. 7/32

OTHER PUBLICATIONS

Thmas, J.; Geraniotis, E., Narrowband jammer Suppression in coded DS–CDMA channels, Military Communications Conference Proceedings, 1999. MILCOM 1999, IEEE, pp. 831–835 vol. 2, Feb. 1999.*

Chen et al., Frame–rate up–convesion using transmitted true motion vectors, Multimedia Signal Processing, 1998 IEEE Second Workshop on pp. 622–627.*

Kafedzishi et al., Vector quantization over Gaussian channels with memory, Commumication, 1995. ICC '95 Seattle, 'Gateqay to Globalization', '995 IEEE International Conference on, vol.: 3, 1995, pp. 1433–1437.*

* cited by examiner

Primary Examiner—Chris S. Kelley
Assistant Examiner—Tung Vo
(74) Attorney, Agent, or Firm—Fleshner & Kim, LLP

(57) ABSTRACT

The motion vector decoder includes a parameter delay block which delays transmissions of various input signals necessary for motion vector decoding; a motion vector residual block which extracts a motion residual value and outputs a positive number of the motion residual value; a motion vector code table block which searches for a motion code, a condition of a sign of the motion code, and a zero condition of the motion code using a variable length decoding table and outputting the searched values; a motion vector delta block which calculates a difference of motion vectors from the motion vector residual block and the motion vector code table block; a MV adder which adds the difference value received from the motion vector delta block and a motion vector of a preceding macroblock to output a new motion vector; and a register which updates a flip-flop corresponding to a current (r, s, t) of a new motion vector. The circuit blocks each have at least one flip-flop to allow processing of each block within a single clock.

18 Claims, 6 Drawing Sheets

FIG.5

|  | + | − | + | − |
|---|---|---|---|---|
| MSB | 0 | 1 | 0 | 1 |
|  | 0 | 1 | 0 | 1 |
|  | 0 | 1 | 0 | 1 |
|  | 0 | 1 | 0 | 1 |
|  | ⋮ | ⋮ | ⋮ | ⋮ |
| f_code | 0 | 0 | 1 | 1 |
|  | (a) | (b) | (c) | (d) |

MOTION VECTOR DECODER

BACKGROUND OF THE INVENTION

1. Field of the Invention

The present invention relates to a motion picture experts group (MPEG) video decoder and more particularly to a motion vector decoder for decoding a motion vector (MV).

2. Description of Related Art

Recently, digitalization of information has already been developed extensively. As a result, the picture compressing technology is becoming the major concern for multimedia. An MPEG is the international standard for coding the digital data of moving picture and is considered as the most effective compressing technology in the multimedia environment. The MPEG technology is widely used as the compressing algorithm in communication, broadcasting, game and the like including a digital TV.

The MPEG video compressing algorithm is based upon two elementary technologies. A block-based motion estimation and compensation of the video are used to reduce the temporal redundancy. Also, a discrete cosine transform (DCT) is used to reduce the spatial redundancy. The motion compensation prediction coding methods use pure predictive encoding and an interpolation encoding predictor, while the prediction error is further compressed through the DCT.

The discrete cosine transformed signals are quantized to reduce the volume of data by expressing the data with a predetermined number of bits. The quantized data is then subjected to variable length coding (VLC) to reduce the overall number of bits by expressing a value frequently appearing with a few bits and a value rarely appearing with many bits. Motion vectors are measured in units of 16×16 blocks and transmitted with variable length coded transform coefficient information. The motion vectors are subjected to the VLC to maximize coding efficiency.

The motion vector (MV) is a two-dimensional vector which indicates an offset of a field coordinate in a reference frame against a current field coordinate or picture. However, the MV may indicate an offset of a frame coordinate in a reference frame or an offset of a field picture. The motion vector is used for the motion compensation. Thus, an encoder must first obtain the MV to estimate motion.

A maximum of 4 MVs can be obtained per macroblock, but transmitting the obtained MVs directly may results in a transmission of a substantial number of bits. To reduce the bits for transmission, the difference between MVs of the current and the preceding macroblock is coded VLC and transmitted. The MV value of the preceding macroblock is stored in a MV predictor and is expressed as pmv[r][s][t]. Namely, the pmv value is the MV of the preceding macroblock (MB) and a value to be coded by the encoder is "vector[r][s][t]−pmv[r][s][t]". The parameters "r" for field type, "s" for picture type, and "t" for direction of vector typically have values of either 0 or 1 and have meanings as shown in Table 1 below. Also, "DMV" represents a difference between the two MVs.

TABLE 1

|   | 0 | 1 |
|---|---|---|
| r | first MV in MB | second MV in MB |
| s | forward MV | backward MV |
| t | horizontal element | vertical element |

For encoding the MV, a block matching is used and a search range must be set in advance for the block matching. The encoder informs a decoder of the preset search range with an f_code. The f_code may have four different sets of MV ranges depending on the s and t values. The decoder would recognize the search range from the f_code according to Table 2 which is an example set of an allowable MV search range as a function of the f_code[s][t] when t=1. The search range for the MV is determined based upon the performance of the encoder in the MPEG.

TABLE 2

| f_code [s] [t] | Vertical element of field vector in frame picture | All other cases |
|---|---|---|
| 0 | (forbidden) | |
| 1 | [−4:+3.5] | [−8:+7.5] |
| 2 | [−8:+7.5] | [−16:+15.5] |
| 3 | [−16:+15.5] | [−32:+31.5] |
| 4 | [−32:+31.5] | [−64:+63.5] |
| 5 | [−64:+63.5] | [−128:+127.5] |
| 6 | [−128:+127.5] | [−256:+255.5] |
| 7 | [−256:+255.5] | [−512:+511.5] |
| 8 | [−512:+511.5] | [−1024:+1023.5] |
| 9 | [−1024:+1023.5] | [−2048:+2047.5] |
| 10~15 | (reserved) | |

The search ranges shown in Table 2 are represented in units of ½ pixels and are multiplied by 2 to make the range values into whole numbers before encoding. For example, in a case of a MV on a horizontal axis, when f_code is 1, the corresponding value in Table 2 is [−8:+7.5]. After multiplication by 2, a "HIGH" value or a maximum displacement is 15, and a "LOW" value or a minimum displacement is −16. The resulting search range is 32, including 0.

In the example above, the DMV is within the range of [−31:+31]. Also, the MV is divided by a variable f, resulting in a quotient value represented by a motion_code and a residual value represented by a motion_residual. The motion_code and motion_residual values are separately coded when coding the MV. Moreover, f=1 when the f_code is 1 and when f=1, only the motion_code value remains because the motion_residual would be 0.

The motion_code is transmitted according to a VLC table as in Table 3 which shows the values from −16 to +16. However, because the range [−31:+31} is greater than the values of the VLC table, the range must be limited to [−16;15]. The values of [−16:+15] within the values of [−31:+31] are directly used as the motion_code. However, the values of [−31:−17] are adjusted to [1:15] by adding the search range value of 32, and the values of [16:31] are adjusted to [−16,−1] by subtracting the search range value of 32. The adjusted values [1:15] and [−16:−1] are called delta and are set as the motion_code. The decoder adds the obtained deltas derived from the limited range [−16:15] to the pmv in order to obtain the DMV.

TABLE 3

| VLC | motion_code [r] [s] [t] |
|---|---|
| 00000011001 | −16 |
| 00000011011 | −15 |
| 00000011101 | −14 |
| 00000011111 | −13 |
| 00000100001 | −12 |
| 00000100011 | −11 |
| 0000010011 | −10 |
| 0000010101 | −9 |
| 0000010111 | −8 |
| 00000111 | −7 |

TABLE 3-continued

| VLC | motion_code [r] [s] [t] |
|---|---|
| 00001001 | −6 |
| 00001011 | −5 |
| 0000111 | −4 |
| 00011 | −3 |
| 0011 | −2 |
| 011 | −1 |
| 1 | 0 |
| 010 | 1 |
| 0010 | 2 |
| 00010 | 3 |
| 0000110 | 4 |
| 00001010 | 5 |
| 00001000 | 6 |
| 00000110 | 7 |
| 0000010110 | 8 |
| 0000010100 | 9 |
| 0000010010 | 10 |
| 00000100010 | 11 |
| 00000100000 | 12 |
| 00000011110 | 13 |
| 00000011100 | 14 |
| 00000011010 | 15 |
| 00000011000 | 16 |

Furthermore, the number of MVs is quite considerable and a VLC table allowing direct coding cannot be made. Thus, the MVs must be grouped. Usually, MV values are large for a picture with great amounts of object motion and MV values are small for a picture with little amount of object motion. If the MV values are divided by a certain value f according to the MV values of a picture, one quotient value frequently appears. Also, the distribution of the appearances of this quotient value would almost be even which allows an efficient coding through use of the same VLC table.

However, the residuals are irregular and cannot be variable length coded, but must be fixed length coded according to the value f. For example, when f=2, the motion_residual is coded with one bit and when f=3, the motion_residual is coded with 2 bits. The number of bits for each motion_residual is calculated and extracted from a bit stream. As a result, the delta, vector [r][s][t], and pmv [r][s][t] would be within a range [LOW:HIGH].

Thus far, the encoding process have been reviewed. The decoding is a reverse process of the encoding process and can be represented with a program language. Similar to the encoding process, the variables such as r_size, f, HIGH, LOW, and range, are first measured. When the motion_code is 0 or when f=1, the delta is set as the motion_code. Otherwise, the delta is measured through the reverse process of the encoding process. If the delta is not within the range [LOW:HIGH], the value of the search range must be added to or subtracted from the delta to adjust the value of the motion_code. An example of a program is shown in Formula 1.

[Formula 1]

r_size = f_code[s] [t] −1;
F =1 << r_size;
High = (16*f) −1;
Low = ((−16)*f);
Range = (32*f);
if((f==1) || (motion_code[r] [s] [t] == 0))
    Delta = motion_code[r] [s] [t];
Else{

-continued

[Formula 1]

Delta=((Abs(motion_code[r] [s] [t])−1)*f)
        +motion_residual[r] [s] [t]+1;
    If(motion_code[r] [s] [t] < 0)
        Delta = −delta;
}
Prediction = PMV[r] [s] [t];
if( (mv_format == "1")&&(t==0)&&(picture_structure=="11"))
    prediction = PMV[r] [s] [t] DIV2;
vector'[r] [s] [t] = prediction + delta;
if(vector'[r] [s] [t] < low)
    vector'[r] [s] [t] = vector'[r] [s] [t] + range;
if(vector'[r] [s] [t] < high)
    vector'[r] [s] [t] = vector'[r] [s] [t] − range;
if((mv_format=="1")&&(t==1)&&(picture_structure=="11"))
    PMV[r] [s] [t] = vector'[r] [s] [t]*2;
Else
    PMV[r] [s] [t] = vector'[r] [s] [t]

However, the program exists as a syntax and must be implemented by a hardware structure. Thus, when a circuit is implemented according to the program as is, an adder, a subtracter, a comparator, and a multiplier are required, resulting in a complicated circuit and a slower processing.

SUMMARY OF THE INVENTION

Accordingly, an object of the present invention is to solve at least the problems and disadvantages of the related art.

An object of the present invention is to provide a high speed MV decoder.

Another object of the present invention is to provide an MV decoder which removes the redundancy of operations and minimizes the arithmetic and logic unit.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

To achieve the objects and in accordance with the purposes of the invention, as embodied and broadly described herein, an MV decoder includes a MV processing block and, a motion vector code table block, a MV delta block, a MV adder, a PMV register, and flip-flops at each circuit block to allow for each block to be processed within a single clock. The MV decoder further includes a parameter delay block delaying transmissions of parameters necessary for MV decoding in the corresponding blocks for the appropriate time period, thereby permitting a pipeline MV decoding.

The motion vector residual block extracts a motion residual value (motion_residual) from input data according to a value f_code_d[3:0] output from the parameter delay block and outputs an 8 bit positive number as the motion residual value.

The motion vector code table block latches input data with a flip-flop; searches for mc_code[3:0], mc_sign, and mc_zero using the variable length decoding table; and latches the searched values before outputting the values. The mc_code[3:0] indicates a value of "abs (motion_code)−1", the mc_sign indicates a sign of the motion_code, and the mc_zero indicates whether the motion_code is 0 or not.

The motion vector delta block includes a shifter shifting the motion_code[3:0] output from the motion vector code table block according to f_code_2d[3:0] output from the parameter delay block; a logic unit performing an OR operation with respect to lower 8 bits among outputs of the shifter and an output of the motion vector residual block; an adder adding a constant 1 to an output of the logic unit; a multiplexer selectively outputting one of an output from the adder or a value obtained by inverting the output of the logic unit according to the condition of the sign of the motion code (mc_sign) output from the motion vector code table block; and a flip-flop which cleared in response to the zero condition value (mc_zero) output from the motion vector code table block and outputting a value obtained by joining the mc_sign value to the output of the multiplexer as a sign bit, in synchronization with a clock.

The motion vector adder includes an adder adding an output of the multiplexer and the delta value output from the motion vector delta block; a flip-flop outputting an output of the adder in synchronization with a clock; an inverter inverting upper 8 bits among the data latched by the flip-flop; a 7:1 multiplexer multiplexing lower 7 bits among upper 8 bits according to a f_code_4d signal output from the parameter delay block; a comparator comparing a most significant bit of the upper 8 bits with an output of the 7:1 multiplexer through an exclusive OR operation; a selection table searching a table for a value corresponding to the f_code_4d signal and outputting the value; a multiplexer selectively outputting either the upper 8 bits output from the flip-flop or an output of the inverter according to a selection signal obtained by performing an AND operation with respect to an output of the comparator and an output of the selection table; and a joining unit joining lower 5 bits bypassed at the flip-flop to the upper 8 bits output from the multiplexer.

BRIEF DESCRIPTION OF THE ATTACHED DRAWINGS

The invention will be described in detail with reference to the following drawings in which like reference numerals refer to like elements wherein:

FIG. 1 is a block diagram of a MV decoder according to the present invention;

FIGS. 2(a) to 2(i) are operational timing charts of each block in FIG. 1;

Figure 1:
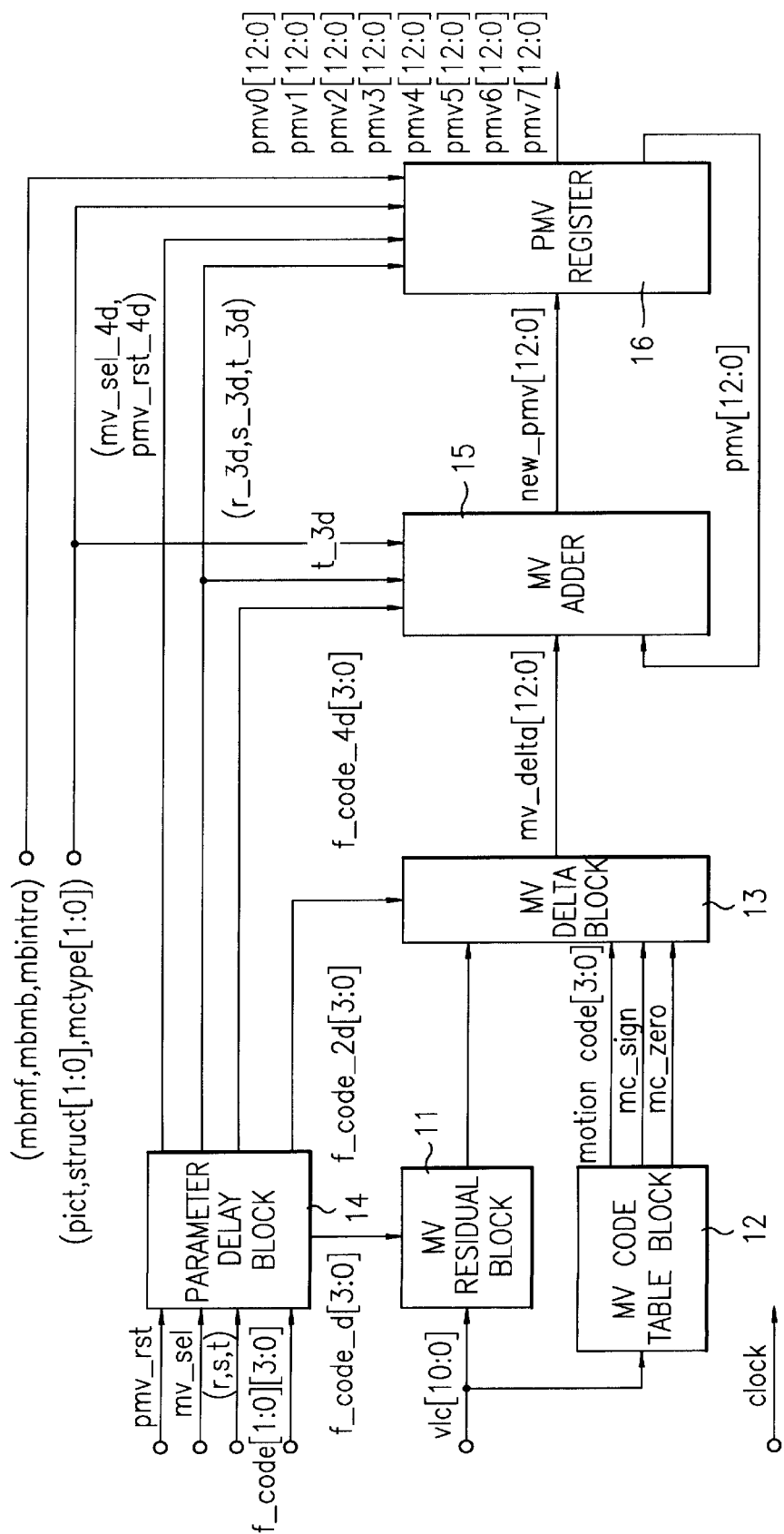
Figure 4:
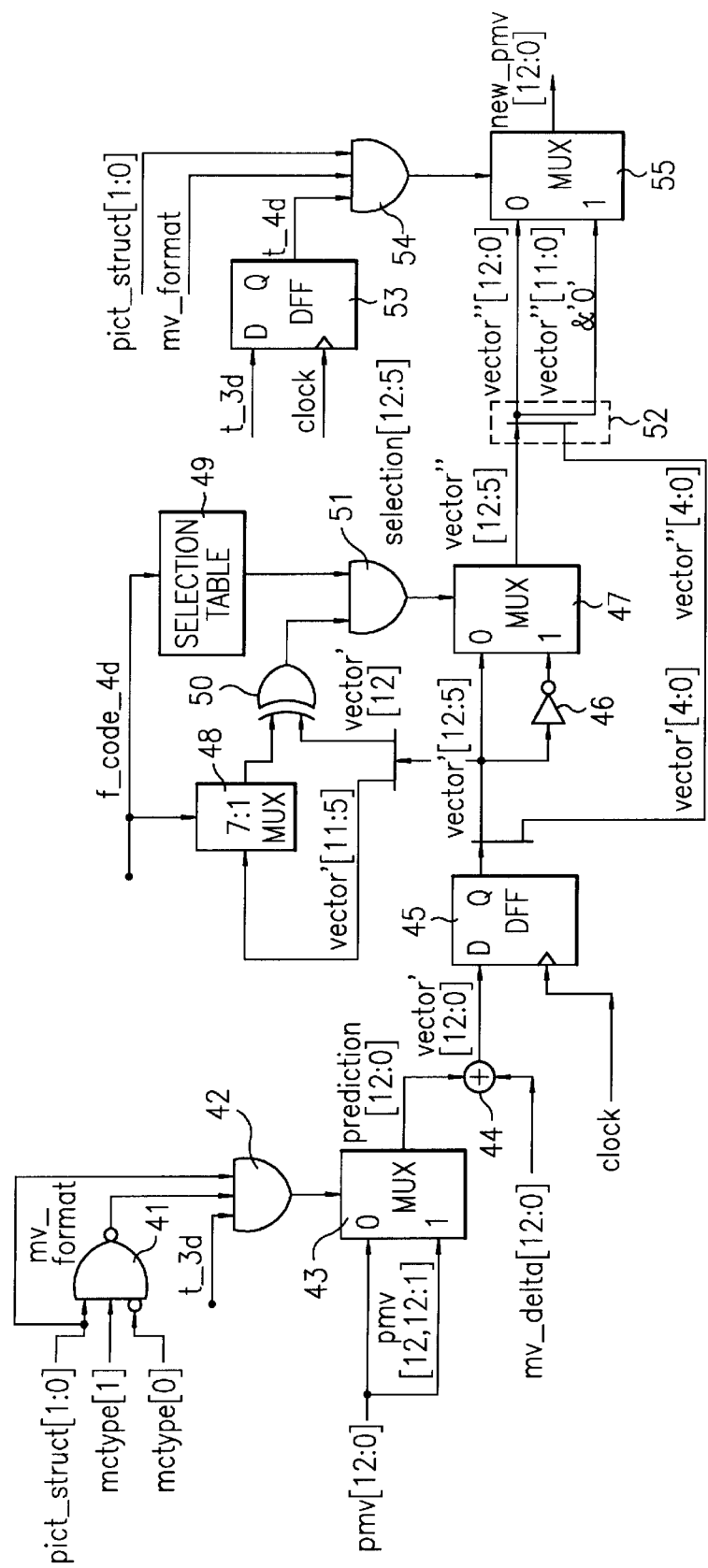
FIG. 4 is a detailed block diagram of a MV adder in FIG. 1.
Figure 5:
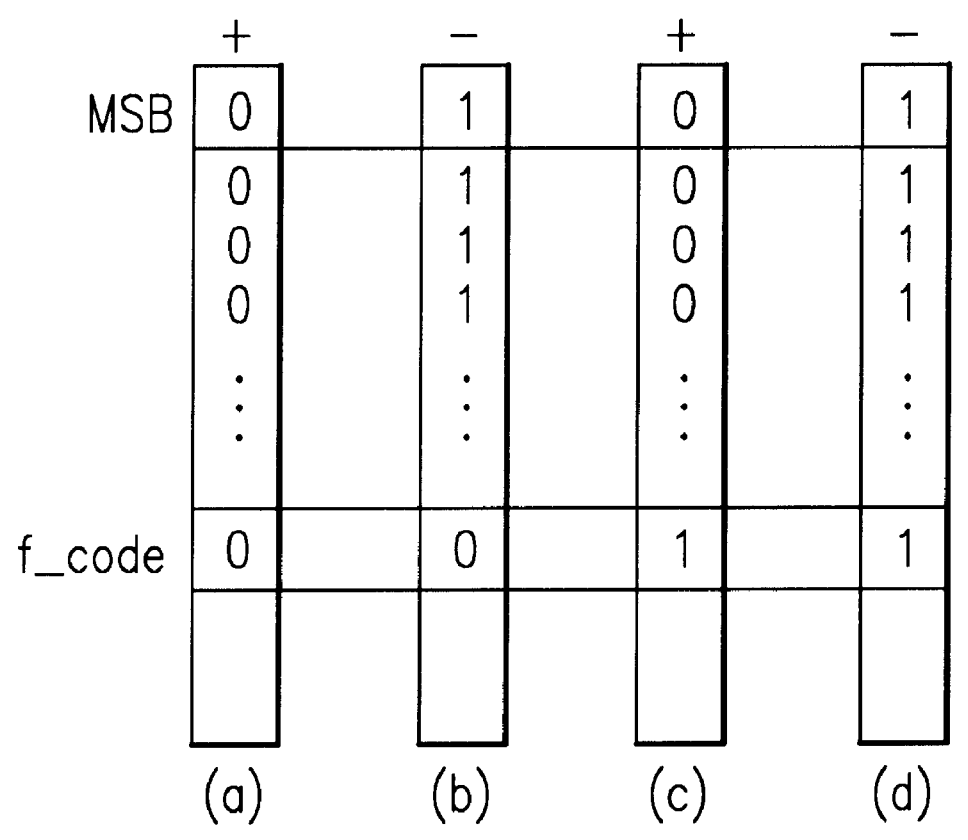
Figure 6:
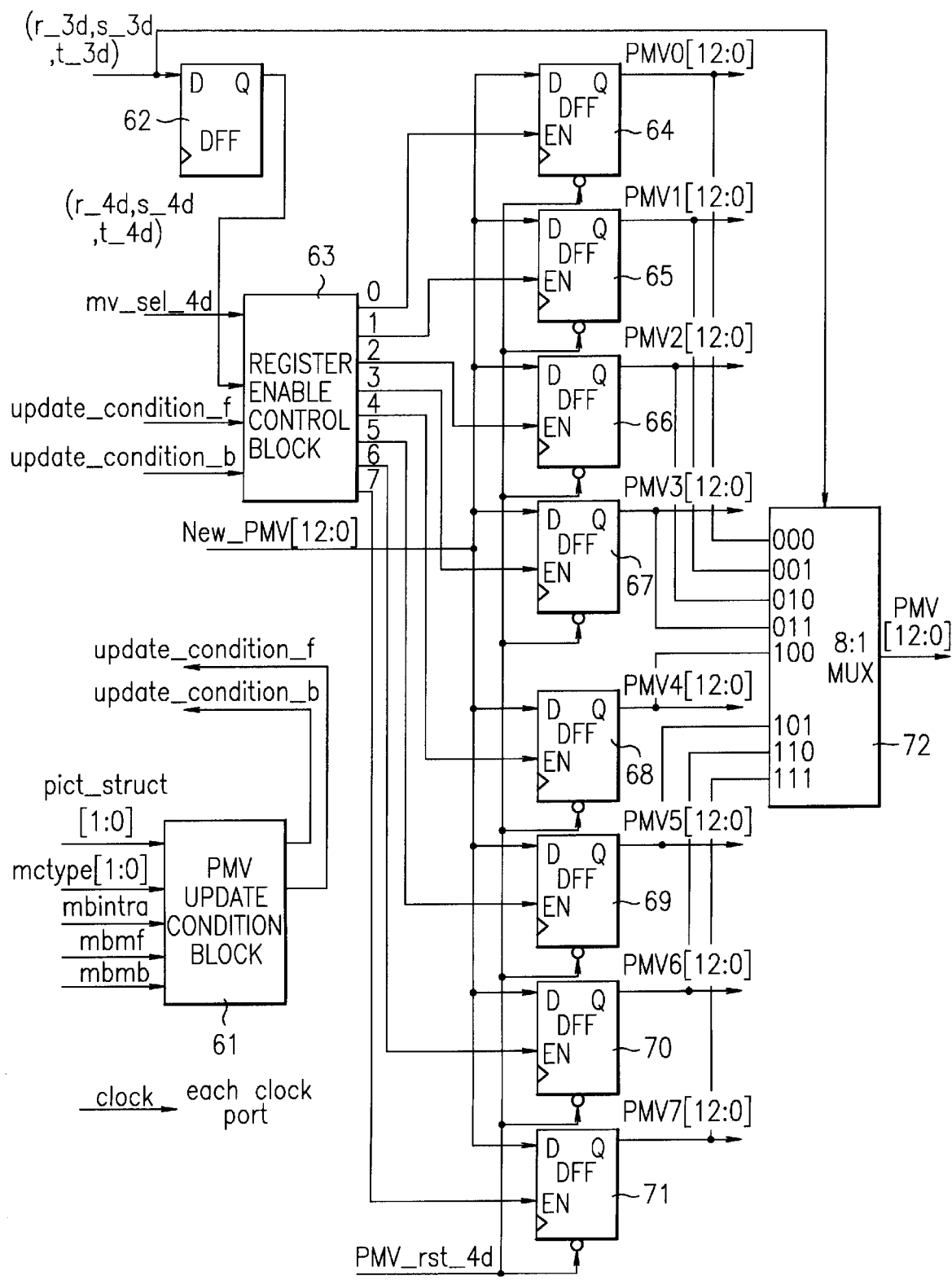

FIGS. 5(a) to 5(d) illustrate cases when the value of a delta is not within a range between a LOW and a HIGH at the MV adder in FIG. 4; and FIG. 6 is a detailed block diagram of a PMV register in FIG. 1.

DETAILED DESCRIPTION OF PREFERRED EMBODIMENT

FIG. 1 shows a preferred embodiment of a MV decoder according to the present invention including a parameter delay block 14 appropriately delaying transmissions of various input signals necessary for MV decoding to each block for a pipeline MV decoding; a MV processing block 11 with extracting a value of a motion residual from input MV data (vlc[10:0]) based upon a value of f_code_d[3:0] which indicates a length of the motion residual value bits, and producing an 8-bit positive number as the motion residual value and a MV code table block 12 receiving the MV data (vlc[10:0]), searching for and outputting mc_code [3:0], mc_sign, and mc_zero using a variable length decoding table constructed based upon a MV code table in the MPEG specifications; a MV delta block 13 calculating mv_delta of 13 bits (the complement of a number 2) which is a value representing the DMV; an MV adder 15 adding the mv_delta value and a MV value of the preceding macroblock pmv to produce a new MV value new_pmv of 13 bits (the complement of a number 2); and a PMV register 16 updating a pmv flip-flop to correspond with a current (r, s, t) of the new_pmv and updating other pmv flip-flops as necessary according to the MPEG specifications even if the flip-flops would not correspond with the current (r, s, t).

Figure 2:
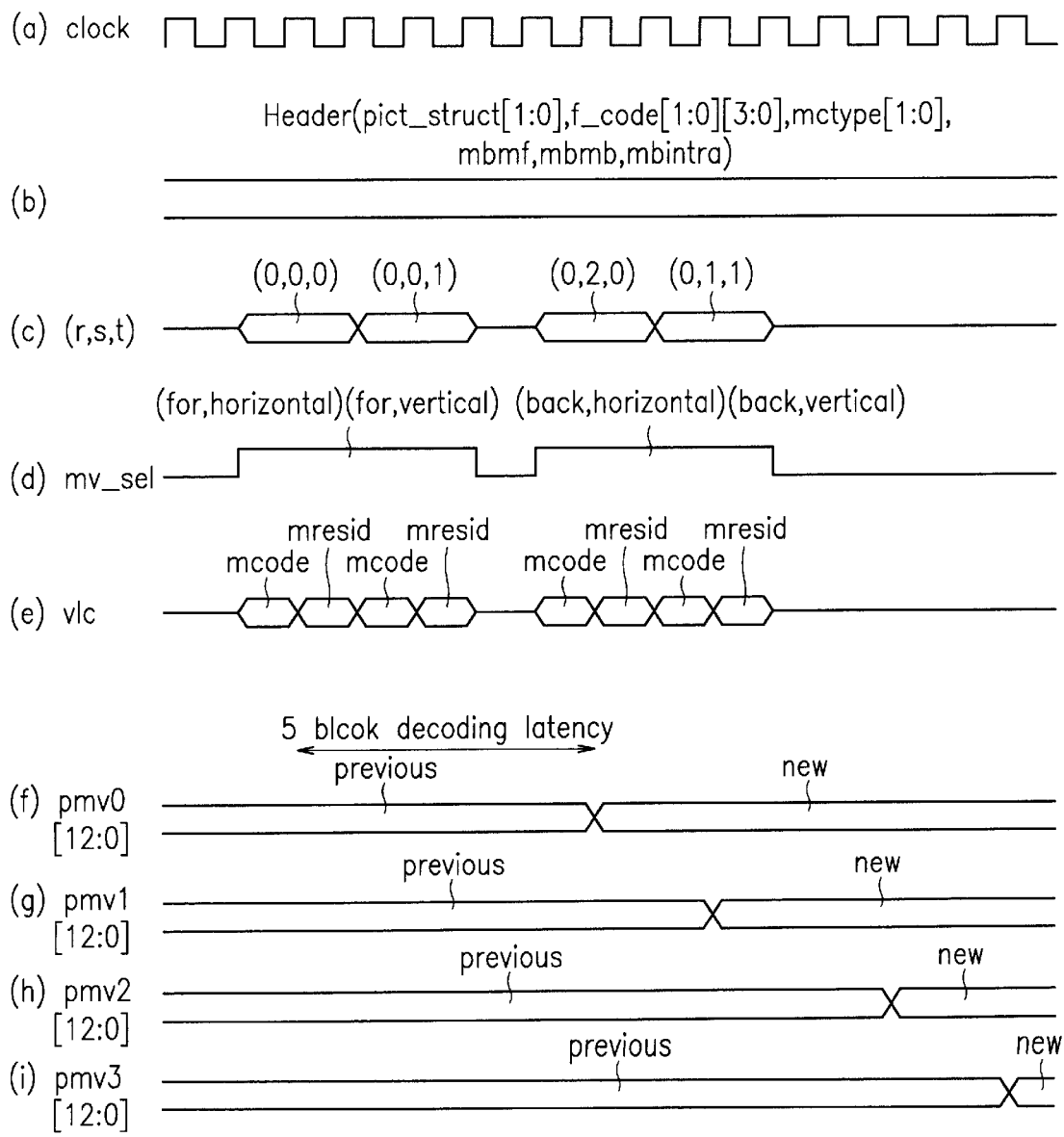

The vlc[10:0], shown in FIG. 2(e), is a MV value variable length coded by the encoder and is received by the MV residual block 11 and the MV code table block. Since maximum of 11 data bits may be produced through the VLC, the vlc[10:0] has a length of 11 bits and is the most significant bit (msb). The msb value may or may not be sent by the encoder and if sent, one or all eight values may be sent.

The signal mv_sel, shown in FIG. 2(d), is received by the parameter delay block 14 and indicates a transmission of the variable length coded MV in synchronization with a current clock through the vlc[10:0]. The signal (r, s, t), shown in FIG. 2(c), indicates the direction and type of the variable length coded MV transmitted in reference to the current clock, as shown in the Table 1 of the MPEG specifications.

FIG. 2(b) shows the values "pict_struct[1:0]", "f_code [1:0][3:0]", "mctype[1:0]", "mbmf", "mbmb", and "mbintra" which are MPEG header information necessary for decoding the MV. The pict_struct[1:0] indicates a picture structure; the mctype[1:0] indicates a motion type; the mbmf indicates macroblock forward motion; the mbmb indicates macroblock backward motion; and mbintra indicates macroblock intra. The header information values, including the f_code, change per macroblock.

The signal pmv_rst has a function of resetting the PMV register to 0 under conditions defined by the MPEG specifications. A clock signal, shown in FIG. 2(a), is the clock pulse for synchronizing the operation of the MV decoder. The signals pmv0~3 [12:0], shown in FIGS. 2(f) to 2(i) are a portion of the output signals forwarding the PMV values of the MPEG specification and are expressed as the complement of a number 2 by 13 bits. The twelfth bit indicates a sign and the indexes 0 to 3 are the values of (r, s, t). Also, the present invention has five clock decoding latency and operates by way of pipeline.

For a pipelining operation, the parameter delay block 14 appropriately delays the transmission of various input signals necessary for the decoding to blocks 11~13, 15, and 16 in FIG. 1. The output signals indicate clock latency. Among the four f_code corresponding to the pairs of (s, t), the parameter delay block 14 selects one f_code corresponding to a current (s, t) pair and appropriately delays the transmission of the f_code to the corresponding block. The parameter delay block 14 applies different latency for each block, after determining the output timings of data to be transmitted to each block according to the clock.

The MV residual block 11 latches the variable length coded MV value (vlc[10:0]) with a D-flip-flop, and produces an 8-bit positive number as a value of a motion residual with a shifter based upon the value of f_code_d[3:0] indicating a length of the motion residual value bit received from the parameter delay block 14. Subsequently, the MV residual block 11 latches the 8-bit positive number with a flip-flop before sending the number to the MV delta block 13. When the value of f_code_d[3:0] is 1, there is no motion residual and 0 is output by the MV residual block 11.

The MV code table block 12 latches the variable length coded MV value (vlc[10:0]) two times with a flip-flop to correspond the output with the MV residual block 11. The MV code table block 12 also searches for mc_code[3:0], mc_sign, and mc_zero using the variable length decoding table constructed based upon the MV code table in MPEG specifications, and latches the searched values before sending them to the MV delta block 13. The mc_code[3:0] is a value of "abs(motion_code)–1" and the mc_sign is the sign of the motion_code. The sign is "+" when the mc_sign is '0' and the sign is '–' when the mc_sign is '1'. The mc_zero indicates whether the motion_code is 0 or not and is '1' when the motion_code is 0.

By transforming the mapping values in the variable length decoding table to output them as mc_code[3:0], mc_sign, and mc_zero, the present invention allows a decrease of logic and an increase of speed at the MV delta block 13. Thus, easy and convenient control is achieved.

The MV delta block 13 calculates mv_delta of 13 bits which is the difference DMV calculated based upon the values received from the MV residual block 11 and the MV code table block 12. The MV adder 15 produces a new MV value new_pmv[12:0] of 13 bits calculated by adding the value of mv_delta received from the MV delta block 13 and an MV value of the preceding macroblock pmv. The value new_pmv[12:0] is sent to the PMV register 16. The MV delta block 13 and the MV adder 15 are implemented by a multiplexer and a shifter. Thus, operation redundancy during the MV calculation from the program language for the MV decoding according to the MPEG specifications is minimized as well as the arithmetic and logic unit.

Figure 3:
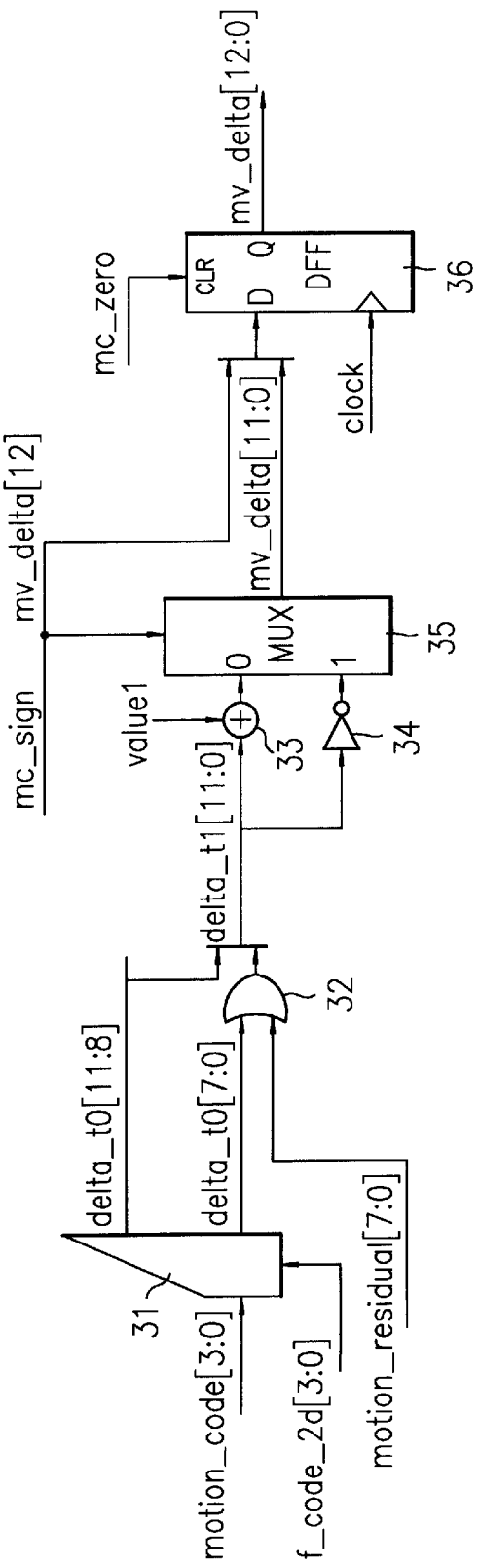
FIG. 3 is a detailed block diagram of a MV delta block in FIG. 1.

FIG. 3 shows the MV delta block 13 of the present invention including a shifter 31 shifting the motion_code [3:0] according to f_code_2d[3:0] received from the parameter delay block 14; an OR gate 32 performing an OR operation with respect to lower 8 bits delta_t0{7:0] from outputs of the shifter 31 and the 8 bits of the motion_residual value; an adder 33 adding a constant 1 to a result of multiplexing the output of the OR gate 32 and upper 4 bits delta_t0[11:8] from outputs of the shifter 31; an inverter 34 inverting the result of multiplexing the output of the OR gate 32 and the delta_t0[11:8]; a multiplexer 35 selecting one of the output of the adder 33 or the output of the inverter 34 according to the mc_sign received from the motion code table 12, and multiplexing the selected output and an mc_sign value as a most significant bit (mv_delta[12]) of a mv_delta; and a flip-flop 36 cleared in response to the mc_zero value output from the MV code table block 12 and outputting a result of the multiplexer 35 and the mv_delta [12] in synchronization with the clock.

The MV delta block 13 calculates mv_delta[12:0] value corresponding to the difference of motion vectors. The MV delta block 13 calculates the following syntax of the Formula 1.

```
If((f==1) || (motion_code[r] [s] [t] == 0))
    Delta = motion code[r] [s] [t];
Else{
    Delta=((Abs(motion_code[r] [s] [t])–1)*f)
        +motion_residual[r] [s] [t]+1;
    If(motion_code[r] [s] [t] < 0)
        Delta = –delta;
    }
```

Specifically, the shifter 31 shifts the motion_code[3:0] as much as an amount obtained by subtracting 1 from the f_code_2d value and sets remaining bits of delta_t0 to 0. A multiplier for multiplication by f is not required to implement the above formula.

In the background art, when f_code=1 and motion_code=0, the motion_code is directly output as the delta value and requires additional multiplexers for the "If" and "Else" commands. According to the present invention, when f_code=1, the upper 4 bits of f_code are output and the motion_residual value is 0, as shown in FIG. 3. As a result, additional multiplexers are not necessary because the motion_code[3:0] is shifted as much as 0 and the motion_residual is set to 0.

Alternatively, when motion_code=0, the delta value is 0, and according to the present invention, the flip-flop 36 is cleared using the mc_zero value (since motion_code=0, mc_zero is 1) output from the MV code table block 12. To implement "Abs(motion_code[r][s][t])–1" in the Formula 1, an absolute arithmetic unit and a subtracter are additionally required. However, the present invention transforms the mapping values to allow the MV code table block 12 to output the motion_code as "Abs(motion_code[r][s][t])–1", obviating the need for additional circuits.

Moreover, in Formula 1, the syntax,
  If(motion_code[r][s][t]<0)
    Delta=–delta;,
is implemented such that delta_t1[11:0] is inverted using the inverter 34 and selectively output according to the mc_sign value output from the MV code table block 12 using the multiplexer 35. Namely, when mc_sign is 0 (when the motion_code value is +), the multiplexer 35 selects the output of the adder 33 obtained by adding a constant 1 to the delta_t1[11:0]. When mc_sign is 1, the multiplexer 35 selects the output of the inverter 34. The adder 33 simply adds the constant 1 and does not require a complicated gate configuration. The flip-flop 36 outputs the stored data when it is enabled by the clock to realize consecutive output of the data, thereby achieving the pipelining.

FIG. 4 shows the MV adder 14 according to the present invention for implementing calculation after the delta calculation of Formula 1. The MV adder 14 includes a NAND gate 41 performing a logic operation with respect to the MPEG header information, such as pict_struct[1:0], mctype [1], and inverted mctype[0], necessary for decoding the MV to output a value of mv_format; an AND gate 42 performing a logic operation with respect to the pict_struct[1:0], the mv_format, and t_3d; a multiplexer 43 selectively outputting either feed-back pmv[12:0] or pmv[12, 12:0] obtained by shifting the feedback pmv[12:0] once, in response to an output of the AND gate 42 as a selection signal; and an adder 44 adding an output of the multiplexer 43 (prediction[12:0]) and the output of the MV delta block 13 (mv_delta{12:0]).

The MV adder also includes a flip-flop 45 latching and outputting an output of the adder 44 (vector'[12:0]) in synchronization with the clock; an inverter 46 inverting upper 8 bits (vector'[12:5]) from the vector'[12:0]; a 7:1 multiplexer 48 multiplexing lower 7 bits (vector'[11:5]) from the upper 8 bits (vector'[12:5]) according to the signal f_code_4d; an exclusive OR gate 50 performing a logic operation with respect to the most significant bit (vector' [12]) of the upper 8 bits (vector'[12:5]) and an output of the multiplexer 48; a selection table 49 searching a table for a value corresponding to the signal f_code_4d, and outputting the value; an AND gate 51 performing a logic operation with respect to an output of the exclusive OR gate 50 and an output of the selection table 49; and a multiplexer 47 selectively outputting either the upper 8 bits (vector'{12:5]) or the output of the inverter 46, in response to an output of the AND gate 51 as a selection signal.

The MV adder further includes a flip-flop 53 delaying an output of the t_3d by one clock; an AND gate 54 performing a logic operation with respect to an output of the flip-flop 53, the pict_struct[1:0], and the mv_format; a joining unit 52 joining an output of the multiplexer 47 (vector"[12:5]) and the bypassed lower 5 bits (vector"[4:0]); and a multiplexer 55 receiving the output of the AND gate 54 as a selection signal to selectively output as a new_pmv[12:0], either the output of the joining unit 52 (vector"[12:0]) or a value (vector"[11:0]&'0') generated by shifting the output of the joining unit 52 one time.

The MV adder 15 having the above configuration is for calculating the following syntax of the Formula 1.

```
Prediction = PMV[r][s][t];
if((mv_format == "1")&&(t==0)&&(picture structure=="11")
    prediction = PMV[r][s][t]DIV2;
vector'[r][s][t] = prediction + delta;
if(vector'[r][s][t] < low)
    vector'[r][s][t] = vector'[r][s][t] + range;
if(vector'[r][s][t] < high)
    vector'[r][s][t] = vector'[r][s][t] - range;
if((mv_format=="1")&&(t==1)&&(picture_structure=="11"));
    PMV[r][s][t] = vector'[r][s][t]*2;
Else
    PMV[r][s][t] = vector'[r][s][t];.
```

Specifically, when mv_format=="1", t==0, and picture_structure=="11", both outputs of the NAND gate 41 and the AND gate 42 are 1. As a result, the multiplexer 43 selectively outputs the pmv[12, 12:0] obtained by dividing the feedback motion vector of the preceding macroblock pmv [12:0] by 2, through shifting. The adder 44 adds the output of the MV delta 13 (mv_delta[12:0]) and the output of the multiplexer 43 to calculate the vector'[r][s][t]. The vector" indicates a vector' which has been computed once in the Formula 1.

The output of the adder 44 is latched at the flip-flop 45 for implementation of the pipelining and output to the next block when the flip-flop 45 is enabled by the clock. Under the following syntax of Formula 1,

```
if(vector'[r][s][t] < low)
    vector'[r][s][t] = vector'[r][s][t] + range;
if(vector'[r][s][t] < high)
    vector'[r][s][t] = vector'[r][s][t] - range;,
``` a search range value is added when the output of the adder 44 is less than the variable LOW, while the search range value is 20 subtracted when the output of the adder 44 is less than the variable HIGH.

To implement the above operations according to the background art, an adder, a subtracter, and a comparator are required, which complicates the circuit and requires a long processing time. The +range indicates that the upper bit is set to 0 and the −range indicates that the upper bit is set to 1. Accordingly, the present invention constructs the circuit with a multiplexer and 2 or 3 gates, thereby simplifying the circuit and increasing the processing speed. Specifically, the inverter 46, the multiplexer 47, the 7:1 multiplexer 48, the selection table 49, the exclusive OR gate 50, and the AND gate 51 are employed for the above operations.

FIGS. 5(a) and 5(d) illustrate cases where the delta value is between the variable LOW and High. FIG. 5(b) illustrate a case when the delta value is less than the variable LOW while FIG. 5(c) illustrates a case when the delta value exceeds the variable HIGH. For cases (b) and (c), the most significant bit is inverted. In this case, upper bits based upon the location designated by the f_code are extension of a sign bit. Thus, if the most significant bit is inverted, all the upper bits based upon the location designated by the f_code should be inverted together. When f_code is 1, the lower 5 bits (vector'[5:0]) from the outputs of the flip-flop 45 are bypassed.

To select the upper 8 bits (vector'[12:5]), the inverter 46 inverts the upper 8 bits immediately after they are output from the flip-flop 45 and sent to the multiplexer 47. The lower 7 bits (vector'[11:5]) from the upper 8 bits (vector' [12:5]) are input to the multiplexer 48. The multiplexer 48 selects a value of a location designated by the f_code and sends the selected value to the exclusive OR gate 50. In other words, the 7:1 multiplexer 48 respectively outputs vector' [5]~vector[11] when the f_code is 1~8, and otherwise the 7:1 multiplexer does not care including when f_code=9.

According to the cases when the output of the adder 44 is outside the range of the variables LOW and HIGH, as shown in FIGS. 5(b) and 5(c), the value of the location designated by the f_code is different from the value of the most significant bit. The exclusive OR gate 50 outputs a high signal when the output of the adder 44 is outside the range of the variables LOW and HIGH. The selection table 49 is a table which inverts all upper bit values set based upon the location designated by the f_code. The selection table 49 is shown in Table 4 below.

TABLE 4

| f_code_4d | Selection[12:5] |
|---|---|
| 1 | 11111111 |
| 2 | 11111110 |
| 3 | 11111100 |
| 4 | 11111000 |
| 5 | 11110000 |
| 6 | 11100000 |
| 7 | 11000000 |
| 8 | 10000000 |
| 9 | 00000000 |
| others | Don't care |

Accordingly, when the multiplexer 47 selectively outputs either the data or the inverted data according to the output of the AND gate 51 which performs a logic operation with respect to the output of the selection table 49 and the output of the exclusive OR gate 50, the vector'[12:0] would always be within the range [LOW:HIGH].

When mv_format=="1", t==1, and picture_structure=="11", the output of the AND gate 54 is 1. When the output of the AND gate 54 is 1, the multiplexer 55 selects a vector"{12:0]&'0' obtained by multiplying a vector"[12:0] by 2 through a shift of the vector"[12:0], and outputs the selected value as the new_pmv[12:0]. For other cases, the multiplexer 55 selects a vector"[12:0], obtained by multiplexing the upper 8 bits (vector'[12:5]) output from the multiplexer 47 and the bypassed lower 5 bits (vector'[5:0]) and outputs the selected value as the new_pmv[12:0].

The PMV register 16 implements the functions of updating a pmv flip-flop to correspond with a current (r, s, t) of the new_pmv and updating other pmv flip-flops which must be updated according to the MPEG specifications even if the flip-flops would not correspond with the current (r, s, t). FIG. 6 is a detailed block diagram of the PMV register 16 according to the present invention.

Generally, the PMV[r][s][t] has eight different values depending on the r, s, and t values, and eight flip-flops 64 to 71 are required as shown in FIG. 6. A multiplexer 72 selects one of the outputs from the eight flip-flops 64 to 71 according to an output of the flip-flop 62. The selected PMV value is output as a final MV value (PMV[12:0]).

Upon receiving the pmv_rst signal, all the pmv flip-flops 64 to 71 are cleared and subsequently, the output of the MV adder 15 is simultaneously input to the pmv flip-flops 64 to 71. Among the eight flip-flops 64 to 71, the pmv flip-flop corresponding to the current (r, s, t) is enabled and the output of the enabled flip-flop is finally output through the multiplexer 72. The PMV register also includes a PMV update condition block 61 which obtains a forward update condition and a backward update condition from a combination of the header information.

Although, one PMV typically updates by enabling one flip-flop, more than one PMV may be used in some MPEG operations. For example, r=0 for a "first" PMV and r=1 for a "second" PMV. In this case, an update condition for the forward condition (s=0) is update_condition_f, and an update backward condition for the backward (s=0) is update_condition_b. When the update_condition_f and update_condition_b are '1', the second PMV is simultaneously updated with the first PMV by the same values.

A register enable control block 63 sends a flip-flop enable signal bit to the corresponding flip-flop 64~71 according to the update conditions, the current (r, s, t), and the mv_sel_4d signal which indicates the commencement of the motion vector calculation. Thus, the PMV register 16 updates the flip-flops 64–71 as described above.

In sum, the preferred embodiment of the MV decoder according to the present invention comprises the MV residual block, MV code table block, MV delta block, MV adder, and PMV register with flip-flops to process each block within a single clock and to delay transmissions of parameters necessary for MV decoding, thereby permitting a high speed MV decoding by pipelining. In addition, the MV decoder of the present invention removes the redundancy of operations during the MV decoding and minimizes the arithmetic and logic unit, thereby simplifying the circuit.

Specifically, the MV code table block outputs mc_code [3:0], mc_sign, and mc_zero after a transformation of the mapping values in the variable length decoding table. Accordingly, the redundancy of operations in the next block is removed, thereby decreasing logic, increasing speed, and implementing easy and convenient control. The MV delta block and the MV adder are constructed with multiplexers and shifters without additional circuits, thereby minimizing an arithmetic and logic unit. When the sum of the delta value and the feed-back PMV value using the MV adder is outside the range of the variables LOW or HIGH, the sign bits are inverted using a multiplexer and a several gates, without an adder, a subtracter, or a comparator, thereby simplifying the circuit and increasing the processing speed. Furthermore, when PMVs are updated to the same new value, conditions are measured according to the MPEG specifications to simultaneously update the PMVs, thereby allowing high speed processing.

The foregoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A motion vector decoder comprising:
    a parameter delay block delaying transmissions of input signals for motion vector decoding;
    a MV processing block extracting a motion residual value from the input motion vector and outputting a positive motion residual value, said MV processing block also extracting and outputting a motion code, a sign condition of the motion code, and a zero condition of the motion code from the input motion vector using a variable length decoding table;
    a motion vector delta block calculating a delta value;
    a MV adder adding the delta value received from said motion vector delta block and a motion vector of a preceding macroblock, and outputting a new motion vector; and
    at least one flip-flop to allow for each block to be processed within a single clock.

2. An apparatus of claim 1, further comprising:
    a register updating a flip-flop which corresponds with a current (r, s, t) on the new motion vector.

3. An apparatus of claim 2, wherein the parameter delay block selects a f_code corresponding to a current (s, t) pair among four kinds of f_code corresponding to the pairs of (s, t), and appropriately delays the transmission of the f_code for motion vector decoding.

4. An apparatus of claim 2, wherein the MV processing block comprises:
    a MV residual block extracting a motion residual value from the input motion vector and outputting a positive motion residual value; and
    a MV code table block extracting and outputting a motion code, a sign condition of the motion code, and a zero condition of the motion code from the input motion vector using a variable length decoding table.

5. An apparatus of claim 4, wherein the MV residual block latches the input motion vector with a flip-flop and extracts an 8-bit positive number as a value of a motion residual with a shifter according to the value of f_code output from the parameter delay block, said MV residual block subsequently latching the 8-bit positive number with a flip-flop prior to outputting the 8-bit positive number.

6. An apparatus of claim 4, wherein the MV code table block latches input data with a flip-flop and searches for the motion code, the sign condition of the motion code, and the zero condition of the motion code using the variable length decoding table, said MV code table latching the searched values prior to outputting the searched values.

7. An apparatus of claim 6, wherein the motion code indicates a value of "abs(motion_code) −1", the sign condition of the motion code indicates a sign of the motion code, and the zero condition of the motion code indicates whether the motion code is 0 or not.

8. An apparatus of claim 2, wherein the motion vector delta block comprises:
    a shifter shifting the motion code output from the MV processing block according to a f_code output from said parameter delay block;
    a logic unit performing an OR operation on the lower 8 bits among the outputs of said shifter and positive output from said signal processing block;
    an adder adding a constant 1 to an output of said logic unit;
    a multiplexer selectively outputting either one of an output from the adder or a value obtained by inverting the output of said logic unit, according to the condition of the sign of the motion code output from the MV processing block; and
    a flip-flop which is cleared in response to the zero condition value output from the MV processing block, and outputting a value obtained by joining the sign of the motion code value to the output of said multiplexer as a sign bit, in synchronization with a clock.

9. An apparatus of claim 8, wherein said shifter shifts the motion code output from said MV processing block by an amount obtained by subtracting 1 from the f_code value and setting the remaining bits to 0.

10. An apparatus of claim 2, wherein said MV adder comprises:

a signal processing block selectively outputting either one of a feed-back motion vector of a preceding macroblock or divided feed-back motion vector of the preceding macroblock obtained by shifting the feed-back motion vector once, in response to a first selection signal;

an adder adding an output of the signal processing block and the delta value output from the MV delta block;

a flip-flop outputting an output of the adder in synchronization with the clock after latching it;

an inverter inverting the upper 8 bits from the data latched by said flip-flop;

a first multiplexer selectively outputting either the upper 8 bits from said flip-flop or an output of said inverter according to a second selection signal;

a joining unit joining the lower 5 bits bypassed at said flip-flop to the upper 8 bits output from said first multiplexer; and a second multiplexer selectively outputting either one of a value obtained by multiplying an output of said joining unit by 2 through shifting or the output of the joining unit as a new motion vector, in response to a third selection signal.

11. An apparatus of claim 10, wherein said signal processing block comprises:

a NAND gate performing a logic operation with respect to at least one of a header information and outputting a format value;

an AND gate performing a logic operation with respect to said at least one of the header information and the format value and a motion vector direction value; and a third multiplexer outputting either one of the feed-back motion vector or the divided feed-back motion vector in response to the output of the AND gate as the first selection signal.

12. An apparatus of claim 11, wherein said header information includes a picture structure value, a mctype value and an inverted mctype value, and wherein the third multiplexer outputs the divided feed-back motion vector when the picture structure equals 11, the format value equals 1 and the motion vector direction value equals 0.

13. An apparatus of claim 10, further comprising:

a 7:1 multiplexer multiplexing the lower 7 bits from the upper 8 bits according to a f_code signal output from said parameter delay block;

a comparator comparing a most significant bit of the upper 8 bits with an output of said 7:1 multiplexer through an exclusive OR operation;

a selection table searching a table for a value corresponding to the f_code signal and outputting the searched value; and an AND gate performing a logic operation with respect to the output of the comparator and the output of the selection table, said AND gate outputting the second selection signal.

14. An apparatus of claim 10, further comprising a flip-flop delaying an output of the motion vector direction value by one clock; and an AND gate performing a logic operation with respect to the output of the flip-flop, a picture_structure value, and a format value, said AND gate outputting the third selection signal.

15. An apparatus of claim 14, wherein the second multiplexer selectively outputting either one of a value obtained by multiplying an output of said joining unit by 2 through shifting when the format value equals 1, the motion vector direction value equals 1 and the picture_structure value equals 11.

16. An apparatus of claim 2, wherein said register comprises:

a plurality of flip-flops simultaneously receiving the output of said MV adder, each flip-flop being enabled and updated according to r, s, and t values;

a multiplexer selecting an output of an updated flip-flop among said multiple flip-flops to output it as a final motion vector, and simultaneously feeding back the selected output to said MV adder;

an update condition block measuring a forward update condition and a backward update condition from related header information; and a register enable control block outputting a flip-flop enable signal to a corresponding flip-flop among said plurality of flip-flops according to the update conditions of said update condition block, the current (r, s, t), and a signal informing a commencement of calculation of the motion vector.

17. A method for motion vector decoding comprising the steps of:

delaying transmissions of input signals for motion vector decoding;

extracting a motion residual value from the input motion vector and outputting a positive motion residual value;

extracting and outputting a motion code, a sign condition of the motion code, and a zero condition of the motion code from the input motion vector using a variable length decoding table;

calculating a delta value based upon the positive motion residual value, a motion code, a sign condition of the motion code, and a zero condition of the motion code;

adding the delta value and a motion vector of a preceding macroblock, and outputting a new motion vector; and implementing at least one flip-flop to process each step within a single clock.

18. A method of claim 17, further comprising the step of updating a flip-flop which corresponds with a current (r, s, t) on the new motion vector.

* * * * *